United States Patent
Fukuda

(10) Patent No.: US 8,190,927 B2
(45) Date of Patent: May 29, 2012

(54) IMAGE PROCESSING APPARATUS, SERIAL BUS CONTROL METHOD, AND STORAGE MEDIUM

(75) Inventor: Michitaka Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 560 days.

(21) Appl. No.: 12/320,220

(22) Filed: Jan. 22, 2009

(65) Prior Publication Data

US 2009/0199022 A1    Aug. 6, 2009

(30) Foreign Application Priority Data

Feb. 1, 2008    (JP) ................................. 2008-023044

(51) Int. Cl.
*G06F 1/32*    (2006.01)
(52) U.S. Cl. .......................... 713/300; 713/310; 713/320
(58) Field of Classification Search .................. 713/300, 713/310, 320
See application file for complete search history.

(56) References Cited

U.S. PATENT DOCUMENTS

| | | | |
|---|---|---|---|
| 7,194,638 B1 * | 3/2007 | Larky .............................. | 713/300 |
| 7,882,297 B2 * | 2/2011 | Sisto et al. ..................... | 710/313 |
| 7,930,572 B2 * | 4/2011 | Bonavita et al. ............... | 713/320 |
| 7,937,600 B1 * | 5/2011 | Lo .................................. | 713/323 |
| 2002/0046355 A1 * | 4/2002 | Takeuchi ....................... | 713/320 |
| 2006/0271802 A1 | 11/2006 | Yanagawa | |
| 2007/0180282 A1 * | 8/2007 | Kim ............................... | 713/320 |
| 2007/0279703 A1 | 12/2007 | Fukuda | |
| 2008/0126815 A1 * | 5/2008 | Cantwell et al. .............. | 713/323 |
| 2008/0170257 A1 | 7/2008 | Fukuda | |
| 2008/0259408 A1 | 10/2008 | Fukuda | |
| 2009/0100275 A1 * | 4/2009 | Chang et al. .................. | 713/300 |
| 2010/0023658 A1 * | 1/2010 | Diab et al. ..................... | 710/59 |
| 2010/0332866 A1 * | 12/2010 | Lee et al. ....................... | 713/300 |

FOREIGN PATENT DOCUMENTS

| | | |
|---|---|---|
| JP | 3246200 | 11/2001 |
| JP | 2002-154253 | 5/2002 |
| JP | 3348330 | 9/2002 |
| JP | 3348331 | 9/2002 |
| JP | 3348526 | 9/2002 |
| JP | 2002-314734 | 10/2002 |
| JP | 3435779 | 6/2003 |
| JP | 3478285 | 10/2003 |
| JP | 2004-5029 A | 1/2004 |

(Continued)

OTHER PUBLICATIONS

Rawin Rojvanit, Power Management for PIC18 USB Microntrollers with nano Watt Technology, Microchip, AN950.*

(Continued)

*Primary Examiner* — Kim Huynh
*Assistant Examiner* — Zahid Choudhury
(74) *Attorney, Agent, or Firm* — Harness, Dickey & Pierce, P.L.C.

(57) ABSTRACT

A disclosed image processing apparatus has a normal power mode and a power saving mode and includes a serial bus; a serial bus PHY configured to control a physical layer of the serial bus, the serial bus PHY being turned off in the power saving mode; a voltage detection unit configured to detect a voltage output from an external device connected to the serial bus; and a physical layer control unit configured to turn on the serial bus PHY when the voltage is detected by the voltage detection unit.

10 Claims, 3 Drawing Sheets

FOREIGN PATENT DOCUMENTS

| JP | 3601205 | 10/2004 |
| JP | 3627726 | 12/2004 |
| JP | 2005-004003 | 1/2005 |
| JP | 3726417 | 10/2005 |
| JP | 3757970 | 1/2006 |
| JP | 2007-4783 A | 11/2007 |

OTHER PUBLICATIONS

Abstract of JP 08-293879 published Nov. 5, 1996.
Abstract of JP 2002-101116 published Apr. 5, 2002.
Abstract of JP 2003-110566 published Apr. 11, 2003.
Abstract of JP 2004-080824 published Mar. 11, 2004.
Abstract of JP 07-212662 published Aug. 11, 1995.
Abstract of JP 08-008913 published Jan. 12, 1996.
Abstract of JP 08-018584 published Jan. 19, 1996.
Abstract of JP 08-293878 published Nov. 5, 1996.
Abstract of JP 10-070561 published Mar. 10, 1998.
Abstract of JP 10-290237 published Oct. 27, 1998.
Japanese Office Action dated Dec. 6, 2011 in corresponding Japanese Application No. 2008-023044.

* cited by examiner

IMAGE PROCESSING APPARATUS, SERIAL BUS CONTROL METHOD, AND STORAGE MEDIUM

BACKGROUND OF THE INVENTION

1. Field of the Invention

A certain aspect of the present invention relates to an image processing apparatus, a serial bus control method, and a storage medium.

2. Description of the Related Art

Nowadays, in terms of reducing the emission of carbon dioxide that causes global warming and of reducing operational costs, reducing power consumption is an important factor in designing devices. This also applies to image processing apparatuses such as a multifunction printer including scanning, printing, and facsimile functions. For example, there are image processing apparatuses having a power saving mode (may also be called an energy saving mode and a sleep mode) for maintaining the power consumption at a low level. In a typical image processing apparatus having a power saving mode, if no request is entered for a predetermined period of time, power supply to a main CPU for controlling the entire system during a normal power mode is stopped and the control is passed to a sub CPU that uses less power to reduce the total power consumption.

Meanwhile, recent image processing apparatuses normally support universal serial bus (USB) that is a serial bus standard (general purpose interface standard) used to connect external or peripheral devices called USB devices. USB has been one of the most popular general purpose interfaces in these years and is widely used to connect external devices.

In order for an external device connected to a USB port to be recognized as a USB device by plug and play, a series of configuration processes such as bus reset, address setting, and device configuration have to be performed. For example, when an external device is connected to a USB port of an image processing apparatus and its bias voltage is detected, a bus reset is initiated and an address is assigned to a device node for the external device within a predetermined period of time.

In the above process, if the image processing apparatus is in the power saving mode when the external device is connected to the USB port, the image processing apparatus switches from the power saving mode to the normal power mode and the main CPU is turned on. However, if the mode switching is not completed within a predetermined period of time, the image processing apparatus cannot respond to the inquiry from the external device in time (the transaction times out) and the external device may hang up.

Patent document 1 discloses an electronic device and an operational mode control method of the electronic device where the bias voltage of an external device connected to an IEEE1394 serial bus is detected when the electronic device is turned on to prevent the hang-up of a communication system.

[Patent document 1] Japanese Patent No. 3348331

However, the invention of patent document 1 relates to a control method at start-up of an electronic device. Meanwhile, unlike other electronic devices, an image processing apparatus such as a multifunction printer is almost always turned on particularly in offices so that it is available all the time. Nevertheless, such an image processing apparatus normally has a power saving mode to reduce power consumption. In this case, it is desired to design the image processing apparatus such that it can quickly switch from the power saving mode to the normal power mode when an external device is inserted into a USB port during the power saving mode and the external device can be reliably connected to the image processing apparatus.

SUMMARY OF THE INVENTION

Aspects of the present invention provide an image processing apparatus, a serial bus control method, and a storage medium that solve or reduce one or more problems caused by the limitations and disadvantages of the related art.

An aspect of the present invention provides an image processing apparatus having a normal power mode and a power saving mode. The image processing apparatus includes a serial bus; a serial bus PHY configured to control a physical layer of the serial bus, the serial bus PHY being turned off in the power saving mode; a voltage detection unit configured to detect a voltage output from an external device connected to the serial bus; and a physical layer control unit configured to turn on the serial bus PHY when the voltage is detected by the voltage detection unit.

Another aspect of the present invention provides an image processing apparatus having a normal power mode and a power saving mode. The image processing apparatus includes a serial bus; a serial bus PHY configured to control a physical layer of the serial bus, the serial bus PHY being turned off in the power saving mode; a main CPU configured to perform a connection setting process of an external device connected to the serial bus, the main CPU being turned on in the normal power mode and being turned off in the power saving mode; a sub CPU configured to control the serial bus, the sub CPU being turned on both in the normal power mode and the power saving mode; a voltage detection unit configured to detect a voltage output from the external device connected to the serial bus; a power mode control unit configured to cause the image processing apparatus to switch from the power saving mode to the normal power mode when the voltage is detected by the voltage detection unit; and a physical layer control unit configured to turn on the serial bus PHY after the image processing apparatus switches from the power saving mode to the normal power mode.

Another aspect of the present invention provides a serial bus control method in an image processing apparatus including a serial bus and a serial bus PHY for controlling a physical layer of the serial bus and having a normal power mode and a power saving mode where the serial bus PHY is turned off. The method includes a voltage detection step of detecting a voltage output from an external device connected to the serial bus; and a physical layer control step of turning on the serial bus PHY when the voltage is detected in the voltage detection step.

Still another aspect of the present invention provides a computer-readable storage medium storing program code for causing a computer to perform the above serial bus control method.

DESCRIPTION OF THE PREFERRED EMBODIMENTS

Preferred embodiments of the present invention are described below with reference to the accompanying drawings.

<Image Processing Apparatus>

Figure 1:
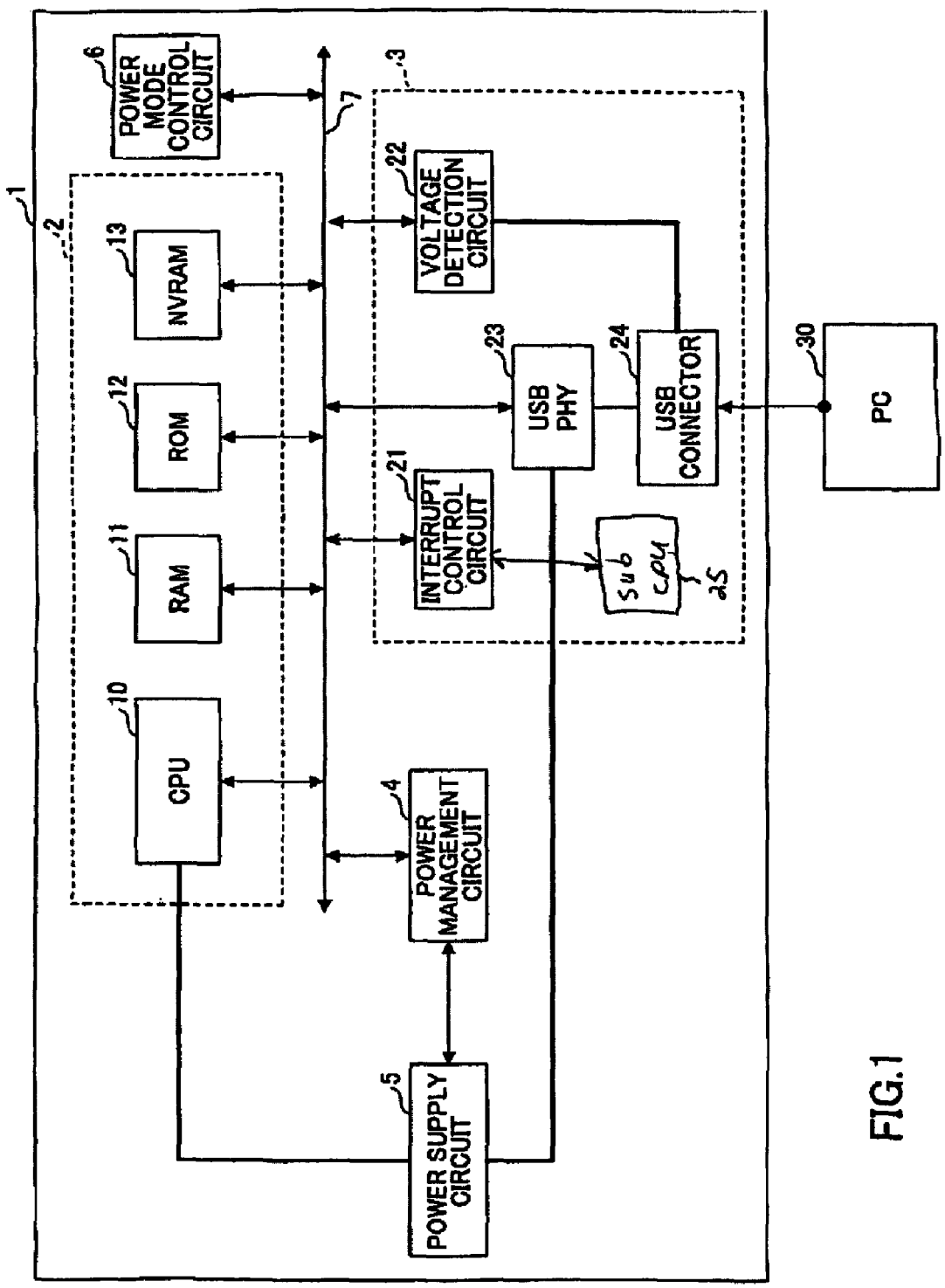
FIG. 1 is a block diagram illustrating an exemplary hardware configuration of an image processing apparatus according to an embodiment of the present invention.

An image processing apparatus according to an embodiment of the present invention is described below. FIG. 1 is a block diagram illustrating an exemplary hardware configuration of an image processing apparatus 1 according to an embodiment of the present invention. The image processing apparatus 1 includes a main control unit 2, a connection control unit 3, a power management circuit 4, a power supply circuit 5, a power mode control circuit 6, and an internal bus 7.

The power mode control circuit (power mode control unit) 6 controls power modes and manages information related to the power modes. For example, the power mode control circuit 6 manages power mode switching conditions and power mode statuses and requests the power management circuit 4 to turn on or off power supply when switching power modes. The image processing apparatus 1 of this embodiment has a power saving mode (may also be called an energy saving mode or a sleep mode) designed to reduce power consumption. In the image processing apparatus 1 having the power saving mode, if no request is entered for a predetermined period of time, power supply to a main CPU for controlling the entire system during a normal power mode is stopped and the control is passed to a sub CPU that uses less power to reduce the total power consumption.

The power management circuit 4 controls the power supply circuit 5. The power supply circuit 5 supplies power to the main control unit 2 including a CPU (main CPU) 10 and to a USBPHY 23 according to a power ON/OFF request from the power management circuit 4 (physical layer control unit).

The main control unit 2 includes the CPU 10, a RAM 11, a ROM 12, and a NVRAM 13 and controls the entire system of the image processing apparatus 1. The CPU 10 controls the entire system including the main control unit 2. The RAM 11, for example, stores programs to be executed by the CPU 10, various parameters, and packets sent from a network. The ROM 12, for example, stores programs to be executed by the CPU 10 and font information. The NVRAM 13 is a nonvolatile memory and is used to store information such as system configuration information and system logs that must not be deleted even when power is turned off.

The connection control unit 3 includes an interrupt control circuit 21, a voltage detection circuit 22, the USBPHY (serial bus PHY) 23, and a USB connector 24 and controls connection between the image processing apparatus 1 and an external device. The connection control unit 3 also includes a network interface (I/F) (not shown) for connection to an external device via a network such as a local area network (LAN). Further, the connection control unit 3 includes a sub CPU 25 that is continuously turned on even when the image processing apparatus 1 switches to the power saving mode and the main CPU 10 of the main control unit 2 is turned off. The sub CPU 25, when a return condition is met, turns on the CPU 10 by controlling the interrupt control circuit 21 and the power mode control circuit 6. The interrupt control circuit 21 sends a power mode switching signal to the power mode control circuit 6 when a return condition for switching from the power saving mode to the normal power mode is met. For example, the interrupt control circuit 21 sends the power mode switching signal when a packet satisfying a return condition is received from the USBPHY 23 or the network I/F. In response to the power mode switching signal, the power mode control circuit 6 turns on the CPU 10 by controlling the power management circuit 4 and the power supply circuit 5. As a result, the image processing apparatus 1 returns to the normal power mode.

Meanwhile, when a USB cable of a USB device such as a personal computer (PC) 30 is connected to the USB connector 24, the voltage detection circuit (voltage detection unit) 22 detects the bias voltage of the USB device and sends a detection signal to the interrupt control circuit 21. The interrupt control circuit 21, when receiving the detection signal, determines that the return condition for switching from the power saving mode to the normal power mode is met and sends a power mode switching signal to the power mode control circuit 6. In response to the power mode switching signal, the power mode control circuit 6 turns on the CPU 10 by controlling the power management circuit 4 and the power supply circuit 5. As a result, the image processing apparatus 1 returns to the normal power mode.

The USBPHY 23 controls the physical layer of USB. The USB connector 24 is a connector for connecting USB devices. In the example shown in FIG. 1, the PC 30 is connected to the USB connector 24.

<USB>

A brief description of USB is given below. USB is one of the most popular general purpose interfaces (a bus standard) for connecting various peripheral devices to a personal computer or other electronic apparatuses. In USB, power is supplied from a personal computer or an electronic apparatus to a USB device connected to a USB port of the personal computer or the electronic apparatus (bus-powered). The introduction of USB 2.0 has increased the transmission speed and reduced the system workload. USB supports Plug and Play by default and can connect up to 127 USB devices by using USB hubs.

The signal lines of USB include a pair of differential data lines, a power line (VBUS), a ground line, and a shield. Although the differential data lines are used in both directions, packet collisions do not basically occur because USB employs half-duplex transmission. As the differential data lines, a twisted pair cable is normally used.

USB uses a differential signal between the differential data lines (D+ and D− lines). At the host side, both of the D+ and D− lines are "pulled down" by a resistance of 15 k$\Omega$. On the other hand, at the device side, either the D+line or the D− line is "pulled up" by a resistance of 1.5 k$\Omega$ according to the transmission speed. In the full speed (or high speed) mode, the D+ line is pulled up; and in the low speed mode, the D− line is pulled up. The USB host detects the connection of a USB device when either one of the D+ and D− lines is pulled up.

When a USB device is connected, an initialization process (connection setting process) is performed between the USB device and the USB host. In the initialization process, after the bus reset is performed, GET_DESCRIPTOR, SET_ADDRESS, and SET_CONFIGURATION commands are exchanged between the USB host and the USB device in the order mentioned. With the commands, an address is assigned to the USB device and the configuration of the USB device is performed.

<Power Saving Mode>

Next, the power saving mode is described. Here, only aspects of the power saving mode that are relevant to the present invention are briefly described. Details of the power saving mode may be obtained from other publications.

The image processing apparatus 1 switches to the power saving mode when a predetermined power saving mode condition (a condition for switching from the normal power mode to the power saving mode) is met. For example, the image processing apparatus 1 switches to the power saving mode if data are not input to the control unit for a predetermined period of time, or when requested by the control unit or by a terminal connected via a network to the image processing apparatus 1. In the power saving mode, power is not supplied to the main control unit 2 including the CPU 10. In other words, power supply from the power supply circuit 5 to the main control unit 2 is turned off. The power supply circuit 5 is controlled via a power supply control line by the power management circuit (power management unit) 4. The power management circuit 4 causes the power supply circuit 5 to turn on or off the power to the main control unit 2 according to a request from the power mode control circuit (power mode control unit) 6 or a request from the sub CPU 25 of the connection control unit 3. In this embodiment, it is assumed that the power management circuit 4 controls the power supply circuit 5 according to a request from the power mode control circuit 6.

Thus, in the power saving mode, since power is not supplied to the main control unit 2 including the CPU 10, the CPU 10 is not in operation and the RAM 11 and the ROM 12 are not available. Meanwhile, even in the power saving mode, power is supplied to the connection control unit 3, the power mode control circuit 6, and components related to the power supply control line (e.g., the power management circuit 4).

In the power saving mode, since power is not supplied to the main control unit 2, connection with external devices is controlled by the sub CPU 25 of the connection control unit 3. If data input from a connected external device can be processed by the sub CPU 25, the image processing apparatus 1 remains in the power saving mode. On the other hand, if a packet such as print data that cannot be processed by the sub CPU 25 is received, power is supplied to the main control unit 2 and the image processing apparatus 1 returns from the power saving mode to the normal power mode.

Power modes are switched according to predetermined power mode switching conditions. Various power mode switching conditions may be defined according to the characteristics of apparatuses. For example, a power saving mode condition may be defined as an occasion where no data are input to an apparatus and the apparatus is not in operation for a predetermined period of time.

<Operations>

Next, exemplary operations of the image processing apparatus 1 are described with reference to flowcharts.

Figure 2:
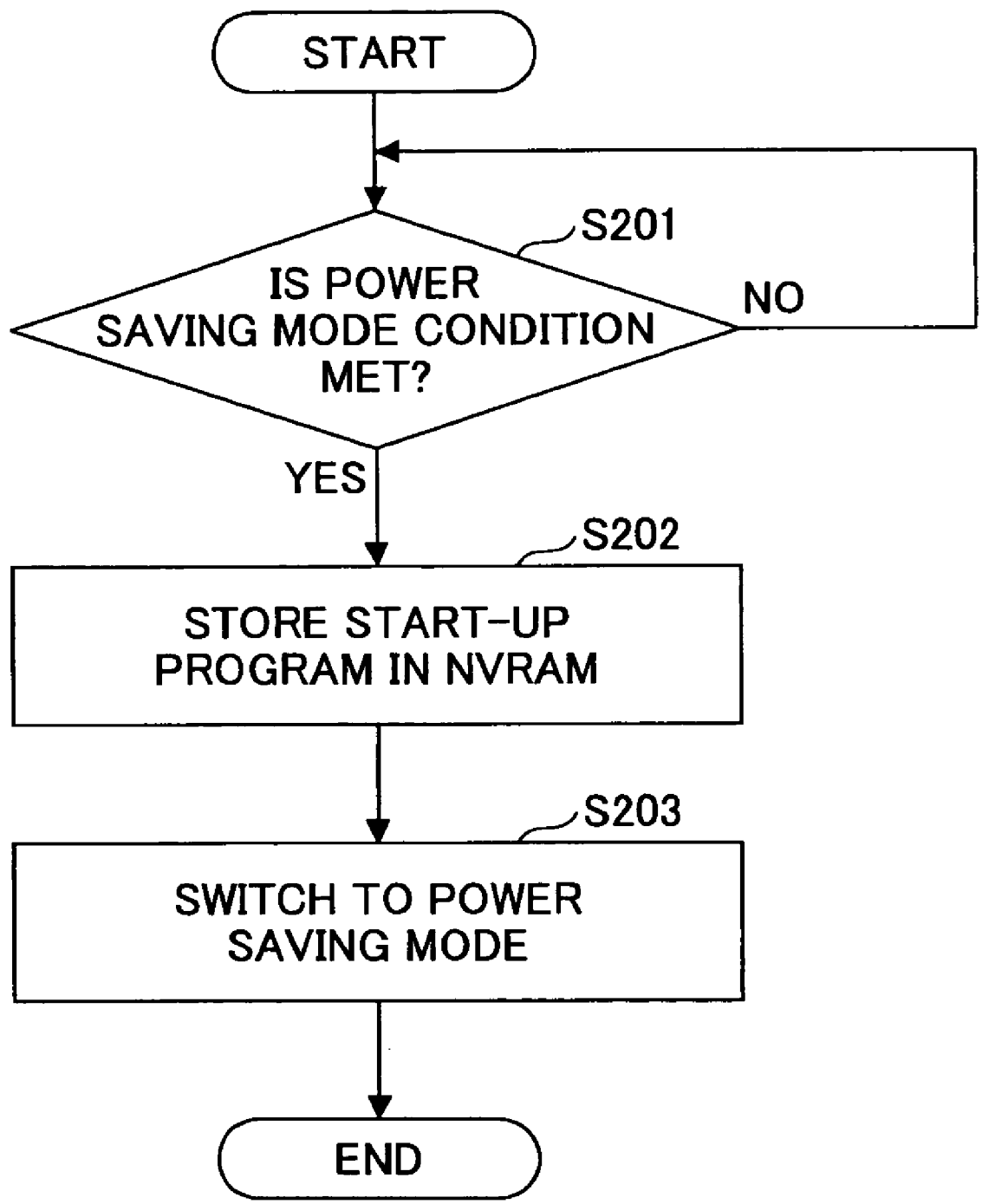
FIG. 2 is a flowchart showing operations of an image processing apparatus during a process of switching from a normal power mode to a power saving mode.

FIG. 2 is a flowchart showing operations of the image processing apparatus 1 during a process of switching from the normal power mode to the power saving mode.

In step S201, if a predetermined power saving mode condition is met while the image processing apparatus 1 is in the normal power mode, a switching process of switching from the normal power mode to the power saving mode is performed.

In step S202, a start-up program, which is to be executed by the CPU 10 is stored in the NVRAM 13 when the image processing apparatus 1 switches (returns) from the normal power mode to the power saving mode. Here, it is assumed that the start-up program is currently stored in the ROM 12 and is transferred (copied) to the NVRAM 13. Any type of nonvolatile RAM may be used for this purpose.

In step S203, the image processing apparatus 1 switches from the normal power mode to the power saving mode. The power saving mode may be defined to have multiple levels (sleep levels). In this embodiment, it is assumed that power supply to the entire main control unit 2 including the CPU 10 is turned off in the power saving mode. The power saving mode makes it possible to reduce the power consumption of the image processing apparatus 1.

Figure 3:
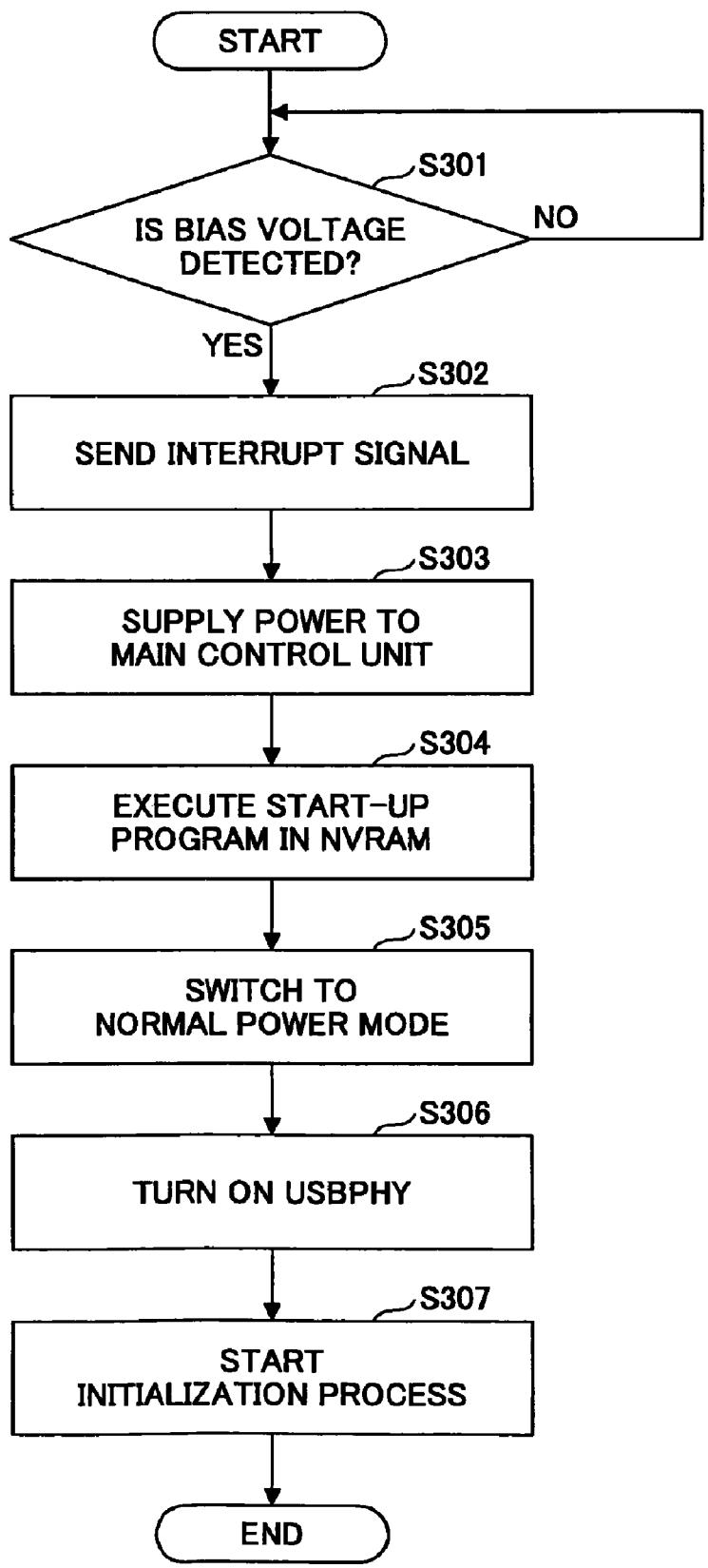
FIG. 3 is a flowchart showing operations of an image processing apparatus during a process of switching from a power saving mode to a normal power mode.

FIG. 3 is a flowchart showing operations of the image processing apparatus 1 during a process of switching (returning) from the power saving mode to the normal power mode.

In step S301, when the PC 30 is connected to the USB connector 24, the voltage detection circuit 22 detects a bias voltage output from the PC 30. At this stage, power is not being supplied from the power supply circuit 5 to the USBPHY 23. Therefore, there is no possibility that the PC 30 detects a bias voltage of the USBPHY 23.

When detecting the bias voltage, the voltage detection unit 22 sends a detection signal to the interrupt control circuit 21. In step S302, when receiving the detection signal, the interrupt control circuit 21 determines that the return condition for switching from the power saving mode to the normal power mode is met and sends an interrupt signal (power mode switching signal) to the power mode control circuit 6. The interrupt control circuit 21 also generates an interrupt signal to trigger a switch from the power saving mode to the normal power mode when other return conditions are met, for example, when a packet satisfying a return condition is received from a network. Various return conditions may be defined. In this embodiment, detection of a bias voltage by the voltage detection circuit 22 is defined as one of the return conditions.

In step S303, the power mode control circuit 6 requests the power management circuit 4 to cause the power supply circuit 5 to supply power to the main control unit 2 including the CPU 10.

In step S304, the CPU 10 executes the start-up program, which is stored in the NVRAM 13 when the image processing apparatus 1 from the power saving mode to the normal power mode, and thereby starts the normal power mode. In this embodiment, the start-up program is read from a high-speed RAM instead of from the ROM 12 to reduce the time necessary to start the normal power mode. A nonvolatile RAM is used for this purpose because power supply to the main control unit 2 is stopped during the power saving mode.

When the transition of the image processing apparatus 1 from the power saving mode to the normal power mode is completed in step S305, the power management circuit 4 requests the power supply circuit 5 to turn on the USBPHY 23 in step S306.

In step S307, an initialization process as described above is performed between the USBPHY 23 and the PC 30.

According to this embodiment, as described above, if an image processing apparatus is in the power saving mode when an external device is connected to a serial bus, the image processing apparatus switches from the power saving mode to the normal power mode, a main CPU is turned on, and then a serial bus PHY is turned on. This configuration makes it possible to prevent the failure of the transaction between an external device and an image processing apparatus and thereby makes it possible to reliably connect the external device to the image processing apparatus.

Also in this embodiment, a start-up program for starting the normal power mode is stored in a high-speed, nonvolatile RAM when an image processing apparatus switches to the power saving mode. This configuration makes it possible to reduce the time necessary to return to the normal power mode and to quickly connect an external device.

An embodiment of the present invention provides a serial bus control method in an image processing apparatus including a serial bus, a serial bus PHY for controlling a physical layer of the serial bus, a main CPU for performing a connection setting process of an external device that is connected to the serial bus and initiates the connection setting process when a bias voltage from the image processing apparatus is detected, and a sub CPU configured to control the serial bus. The image processing apparatus has a normal power mode where the main CPU and the sub CPU are turned on and a power saving mode where the main CPU and the serial bus PHY are turned off. The serial bus control method includes a voltage detection step of detecting a voltage output from the external device connected to the serial bus; a power mode control step of causing the image processing apparatus to switch from the power saving mode to the normal power mode when the voltage is detected in the voltage detection step; and a physical layer control step of turning on the serial bus PHY after the image processing apparatus switches from the power saving mode to the normal power mode.

The above described embodiments may also be applied to a system, a method, and a storage medium containing program code for causing a computer to perform the method.

Thus, embodiments of the present invention provide an image processing apparatus, a serial bus control method, and a storage medium that make it possible to reliably connect an external device to a serial bus.

The present invention is not limited to the specifically disclosed embodiments, and variations and modifications may be made without departing from the scope of the present invention.

For example, in addition to USB, the present invention may be applied to IEEE serial buses. Also, in addition to image processing apparatuses, the present invention may be applied to information processing apparatuses having a power saving mode and a serial bus. In the above embodiments, a serial bus PHY is turned on after an image processing apparatus switches from the power saving mode to the normal power mode and a main CPU is turned on. Alternatively, the serial bus PHY may be continuously turned on and controlled to start an initialization process of an external device connected to a serial bus after the image processing apparatus switches from the power saving mode to the normal power mode.

The present application is based on Japanese Priority Application No. 2008-023044, filed on Feb. 1, 2008, the entire contents of which are hereby incorporated herein by reference.

What is claimed is:

1. An image processing apparatus having a normal power mode and a power saving mode, comprising:
   a serial bus;
   a serial bus PHY configured to control a physical layer of the serial bus, the serial bus PHY being turned off in the power saving mode;
   a main CPU configured to perform a connection setting process of an external device connected to the serial bus, the main CPU being turned on in the normal power mode and being turned off in the power saving mode;
   a sub CPU configured to control the serial bus, the sub CPU being turned on both in the normal power mode and the power saving mode;
   a voltage detection unit configured to detect a voltage output from the external device connected to the serial bus;
   a power mode control unit configured to cause the image processing apparatus to switch from the power saving mode to the normal power mode when the voltage is detected by the voltage detection unit;
   a physical layer control unit configured to turn on the serial bus PHY after the image processing apparatus switches from the power saving mode to the normal power mode;
   a ROM configured to store a start-up program for starting the normal power mode; and
   a nonvolatile RAM being turned off in the power saving mode,
   wherein the main CPU is configured to store the start-up program in the nonvolatile RAM before the image processing apparatus switches from the normal power mode to the power saving mode and to execute the start-up program stored in the nonvolatile RAM when the image processing apparatus switches from the power saving mode to the normal power mode,
   the sub CPU is configured to turn on the main CPU when the image processing apparatus switches from the power saving mode to the normal power mode.

2. The image processing apparatus as claimed in claim 1, wherein the serial bus is a universal serial bus.

3. The image processing apparatus as claimed in claim 1, further comprising:
   a network interface for connection to the external device via a network.

4. The image processing apparatus as claimed in claims 1, wherein the external device is a USB device, and the voltage is bias voltage of the USB device.

5. The image processing apparatus as claimed in claim 1, further comprising:
   an interrupt control circuit configured to send a power mode switching signal to the power mode control unit when the voltage is detected by the voltage detection unit.

6. A serial bus control method in an image processing apparatus including a serial bus, a serial bus PHY for controlling a physical layer of the serial bus and having a normal power mode and a power saving mode where the serial bus PHY is turned off, a main CPU being turned on in the normal power mode, a sub CPU being turned on both in the normal power mode and the power saving mode, a ROM storing a start-up program for starting the normal power mode and a nonvolatile RAM being turned off together with the main CPU in the power saving mode, the method comprising:
   detecting a voltage output from an external device connected to the serial bus;
   turning on the serial bus PHY when the voltage is detected in the voltage detection step;
   storing the start-up program in the nonvolatile RAM by the main CPU before the image processing apparatus switches from the normal power mode to the power saving mode;
   turning on the main CPU by the sub CPU when the image processing apparatus switches from the power saving mode to the normal power mode; and
   executing the start-up program stored in the nonvolatile RAM by the main CPU.

7. A non-transitory computer-readable storage medium having program code embodied therein, when executed on the image processing apparatus, performs the serial bus control method as claimed in claim 6.

8. The serial bus control method as claimed in claim 6, wherein the image processing apparatus further includes a network interface for connection to the external device via a network;
   a method further comprising the steps of:
   connecting the image processing apparatus to the external device using the network interface.

9. The serial bus control method as claimed in claim 6, wherein the external device is a USB device, and the voltage is bias voltage of the USB device.

10. The serial bus control method as claimed in claim 6, wherein the image processing apparatus further includes an interrupt control circuit configured to send a power mode switching signal when the voltage is detected,
    wherein turning on the serial bus PHY is performed after the image processing apparatus from the power saving mode to the normal power mode.

* * * * *